United States Patent [19]
Krawchuk et al.

[11] Patent Number: 5,621,627
[45] Date of Patent: Apr. 15, 1997

[54] A.C. TO A.C. POWER CONVERTER FOR THE ADAPTIVE CORRECTION OF WAVEFORM ABNORMALITIES

[75] Inventors: John Krawchuk, Toronto; Ian J. Forsyth, Minesing; John G. H. Eriksen, Thorhill, all of Canada

[73] Assignee: AC International Inc., Bridgetown, Barbados

[21] Appl. No.: 422,272

[22] Filed: Apr. 14, 1995

[51] Int. Cl.$^6$ .......................... H02M 5/45; H02M 5/456; H02M 3/24; H02M 5/42

[52] U.S. Cl. ................................ 363/37; 363/97

[58] Field of Search .................. 363/34, 35, 37, 363/51, 95, 97, 98

[56] References Cited

U.S. PATENT DOCUMENTS

| | | | |
|---|---|---|---|
| 4,063,146 | 12/1977 | Oliver. | |
| 4,118,688 | 10/1978 | Glennon | 340/516 |
| 4,523,269 | 6/1985 | Baker et al.. | |
| 4,587,604 | 5/1986 | Nerone. | |
| 4,648,017 | 3/1987 | Nerone. | |
| 4,761,727 | 8/1988 | Kammiller. | |
| 4,827,151 | 5/1989 | Okada. | |
| 4,894,763 | 1/1990 | Ngo. | |
| 4,912,386 | 3/1990 | Lurie | 318/615 |
| 4,961,130 | 10/1990 | Kirchberg, Jr.. | |
| 4,977,492 | 12/1990 | Kirchberg, Jr. et al.. | |
| 5,018,058 | 5/1991 | Ionescu et al.. | |
| 5,043,857 | 8/1991 | Kirchberg, Jr. et al.. | |
| 5,045,991 | 9/1991 | Dhyanchand et al.. | |
| 5,053,939 | 10/1991 | Kirchberg, Jr. et al.. | |
| 5,055,939 | 10/1991 | Karamon et al.. | |
| 5,111,374 | 5/1992 | Lai et al.. | |
| 5,307,258 | 4/1994 | Schmidhauser. | |
| 5,315,497 | 5/1994 | Severinsky | 363/34 |
| 5,363,443 | 11/1994 | Petty | 379/418 |
| 5,397,983 | 3/1995 | Zabar et al. | 324/133 |
| 5,400,237 | 3/1995 | Flanagan et al.. | |
| 5,465,011 | 11/1995 | Miller et al. | 307/64 |
| 5,475,296 | 12/1995 | Vinsant et al.. | |

FOREIGN PATENT DOCUMENTS 2114809 10/1994 Canada.

OTHER PUBLICATIONS

International Search Report, Aug. 23, 1996, European Patent Office.

Von Raumer et al.: "Applied Nonlinear Control of an Induction Motor Using Digital Signal Processing", IEEE Transactions on Control Systems Technology, vol. 2, No. 4, Dec. 1994, pp. 327–335.

Agelidis, Vassilios G. and Vincenti, Donato: "A Smart Switch Based Three–Phase ZVS PWM Topology", Curtin University of Technology and Concordia University, pp. 275–279 (0–7803–1456–5/94 IEEE), 1994.

Kasemsan et al.: "PWM Zero–Voltage Switching Single–Ended Current–Fed Converters With Output Isolation", Rockwell International Corp. University of Illinois at Chicago and University of Central Florida, pp. 150–158 (0–7803–1456–5/94 IEEE), 1994.

(List continued on next page.)

Primary Examiner—Peter S. Wong
Assistant Examiner—Bao Q. Vu
Attorney, Agent, or Firm—Jeffrey T. Imai; Arne I. Fors; D. Doak Horne

[57] ABSTRACT

A device for controlling an AC output with an AC load from an AC supply comprises a power amplifier module connected to the AC supply and a control module in communication with the AC supply and the power amplifier module. The power amplifier module converts an AC supply to DC and then converts the DC to an AC output. The control module extracts predetermined characteristics, such as current, voltage and frequency from the AC supply and compares the predetermined characteristics with stored load characteristics of the AC load. The control module responsively triggers the power amplifier module to generate an output waveform of the AC output substantially in phase with respect to the AC supply.

15 Claims, 10 Drawing Sheets

OTHER PUBLICATIONS

Chen et al.: "A Hybrid Inverter/Cycloconverter–Based Variable–Speed Three–Phase Induction Motor Drive for Single–phase Inputs:", University of Wisconsin, pp. 514–520 (0–7803–1456–5/94 IEEE), 1994.

Tu, Rong–Jie and Chen, Chern–Lin: "A New Three–Phase Space–Vector–Modulated Power Factor Corrector", National Taiwan University, pp. 725–737 (0–7803–1456–5/94 IEEE), 1994.

Zargari, Navid R., and Joos, Geza: "A Near Unity Power Factor Input Stage with Minimum Control Requirements for AC Drive Applications", Concordia University, 1994, pp. 368–393 (0–7803–1456–5/94 IEEE).

Fickett, et al.: "Efficient Use of Electricity Advanced technologies offer an opportunity to meet the work's future energy needs while minimizing the environment impact. Both suppliers and consumers of electricity can benefit from the savings", Scientific American, Sep. 1990 pp. 65–74.

Price, Kenneth: "Energy Efficiency vs Power Quality: Case Studies in Equipment Incompatibility", Electricity Today, vol. 5, No. 4, Apr. 1993, pp. 12, 14 and 18.

Ontario Hydro: "Be A Power Saver: Energy Management Series—Harmonics".

Sines, Stephen: "Energy Management: Power Factor Correction is Still One of Best Methods For Reducing Electrical Bills", Electricity Today, vol. 7, No. 1, Jan. 1995, pp. 21–24.

Sweo, Ed: "Combating Harmonics in Variable–Speed Drives", Machine Design, Sep. 12, 1994, pp. 52–57.

Cheung, Richard: "Active Filtering Technology", Ryerson Polytechnic University, Sep., 1993.

Karshenas, Hamid et al.: "Generalized Techniques of Selective Harmonic Elimination and Current Control In Current Source Inverters/Converters", 1994. (0–7803–1456–5/94 IEEE).

Joos, Geza: "A High Performance Voltage–Regulated CSI AC Induction Motor Drive", Concordia University, 1994, pp. 501–506 (0–7803–1456–5/94 IEEE).

Gyma, Dennis: "A Novel Control Method to Minimize Distortion in AC Inverters", Hewlett–Packard Company, 1994, pp. 941–946. (0–7803–1456–5/94 IEEE).

Rastogi, Mukul et al.: "Three–Phase Sinusoidal Current Rectifier With Zero–Current Switching", University of Minnesota and Schott Corporation, 1994, pp. 718–724. (0–7803–1456–5/94 IEEE).

Jang, Yungstack and Erickson, Robert W.: "New Single–Switch Three–Phase High Power Factor Rectifiers Using Multi–Resonant Zero Current Switching", University of Colorado at Boulder, 1994, pp. 711–717. (07803–1456–5/94 IEEE).

Da Costa, A.V., Treviso, C.H.G. and Freitas, L.C.: "A New ZCS–ZVS–PWM Boost Converter With Unit Power Factor Operation", Universidade Federal de Uberlandia, 1994, pp. 404–410. (0–7803–1456–5/94 IEEE).

Faldella, E., Rossi, C.: "High Efficiency PWM Technologies for Digital Control of DC–AC Converters", University of Perugia and University of Bologna, 1994, pp. 115–121. (0–7803–1456–5/94 IEEE).

Arefeen, M.S., et al.: "Indirect Startup Rotor Position Sensor For Synchonous Reluctance Motor", Texas A&M University and University of Wisconsin–Madison, pp. 78–82. (0–7803–1456–5/94 IEEE).

Refif, J.M. et al.: "Use of ASIC's in PWM Techniques For Power Converters", Cegely (CNRS 829), 1993, pp. 683–687. (0–7803–0891–3/93 IEEE).

Dunford, W.G. et al.: "The Analysis and Implementation of a Discontinuous PWM Scheme", University of British Columbia, Imperial College, Rand Afrikaans University, 1994, pp. 128–134. (0–7803–1456/5/94 IEEE).

Agrawal, Jal P., Farook, Omer, and Sekhar, C.R.: "Software Controller for PWM Converters", Purdue University Calumet, 1994, pp. 947–953. (0–7803–1456–5/94 IEEE).

Hower, Bill, "Tech Memo", E Source, Inc., Nov. 1993.

Ontario Hydro Technologies: "Variable Speed Drive and Power System Compatibility", Report for the Canadian Electrical Association, Dec., 1993, pp. v–vii; 7–9; 54–57; 198–201; 211–218.

"Energy Management Controller", Microchip Technology Incorporated, 1994.

Chen, Keming, Elasser, Ahmed, and Torrey, David: "A Soft Switching Active Snubber Optimized for IGBTs in Single Switch Unity Power Factor Three–Phase Diode Rectifiers", REM Technologies and Rensselear Polytechnical Institute, 1994, pp. 280–286. (0–7803–1456–5/94 IEEE).

Sulistyono, Widodo, Enjeti, Prasad: "A Series Resonant AC–to–DC Rectifier With High Frequency Isolation", Texas A&M University, 1994, pp. 397–403. (0–7803–1456–5/94 IEEE).

Kim, S. and Enjeti, P.: "A New Three Phase AC to DC Rectifier with Active Power Factor Correction", Texas A&M University, 1994, pp. 752–759. (0–7803–1456–5/94 IEEE).

Gatarie, Solbodan et al.: "Soft–Switched Single–Switch Three–Phase Rectifier With Power Factor Correction", Virginia Polytechnic Institute and State University, 1994, pp. 738–744. (0–7803–1456–5/94 IEEE).

Barbi, I., Fagundes, J.C. and Cruz, C.M.T.: "A Low Cost High Power Factor Three–Phase Diode Rectifier With Capacitiative Load", 1994, pp. 745–751. (0–7803–1456–5/94 IEEE).

A.C. TO A.C. POWER CONVERTER FOR THE ADAPTIVE CORRECTION OF WAVEFORM ABNORMALITIES

FIELD OF INVENTION

This invention relates to a device for controlling energy transfers, including correcting power factors, and a method of effecting energy transfers.

BACKGROUND OF INVENTION

Electric power is commercially available in a variety of alternating current formats, either in single phase or multiple-phase, 50Hz or 60Hz, and up to 550V.

Power consumption is directly proportional to the vector product of voltage and current. If voltage and current are in phase, real power consumption is readily calculable. However if the current shifts relative to the voltage, the apparent or reactive power consumption is more difficult to measure using conventional methods. Accordingly, hydro utilities install a special meter for measuring the angle between the voltage and current. If the reactive power shifts beyond an acceptable amount, normally 5–10%, the customer is penalized.

The amount of phase shift is dependent upon the type of load being driven by the electric power. A predominantly reactive load will shift the current relative to the voltage in a positive sense whereas a predominantly capacitive load will shift the current in the negative sense.

In a typical example, when three phase 550V AC is supplied to a 550V 150 hp loaded motor, the total amperage that the motor is receiving is in excess of 140 amps. This current must not lag more than 5–10% behind the voltage, otherwise penalty charges are imposed by the utility. The inductive loads inherent in the windings of the motor will shift the current, up to 90°, depending on the actual inductive, capacitive and resistive components in the system.

Traditional techniques that have been used in the past have tried to make use of transformers and capacitors to try to phase correct this current shift. However, the current shift and the size of the transformers and capacitors necessitates a very large and cumbersome and hence expensive solution. For example, a Westinghouse system which can only handle about a 20 hp motor, has a size in excess of 4 feet high and 2 feet by 2 feet in base area.

Still other devices exist such as those found in the following U.S. Pat. Nos.; 4,894,763, 4,961,130, 4,977,492, 5,043,857, 5,055,939, 5,045,991, 5,111,374. What these devices attempt to do is through either other inductors, capacitors or combinations of both, some being computer controlled, cause the current to be further delayed so that it appears during the next sinusoidal voltage waveform in the correct position. Hence these devices are generally large and complex.

Heretofore, no single type of device has been suitable for all types of loads, whether reactive, capacitive or variable between the two.

SUMMARY OF THE INVENTION

The disadvantages of the prior art may be overcome by providing a device which has an output AC which is dynamically phase shifted from the AC supply dependent upon the impedance nature of the load to maintain the current of the output AC in phase with respect to the AC supply.

It is desirable to provide a device which receives an AC supply, measures characteristics of the AC supply, converts the AC supply to DC, selects characteristics of a preselected load type, applies the characteristics of a preselected load type to the DC generating an AC output, measures the predetermined characteristics of the AC output and modifies the selected characteristics and reapplies the selected characteristics to the DC and repeats the modification step and reapplication step until the AC output is substantially in phase with the AC supply.

According to one aspect of the invention, there is provided a device for controlling an AC output with an AC load from an AC supply. The device comprises a power amplifier module connected to the AC supply and a control module in communication with the AC supply and the power amplifier module. The power amplifier module converts an AC supply to DC and then converts the DC to an AC output. The power amplifier module extracts predetermined characteristics, such as current, voltage and frequency from the AC supply and the control module compares these predetermined characteristics with the corresponding predetermined characteristics of the AC load. The control module then triggers the power amplifier module to convert the DC to the AC output substantially in phase with respect to the AC supply, with sufficient current to meet the demand of the AC load.

According to another aspect of the invention, there is provided a look up table for storing pulse modulation sequences of various AC load types. The control module initially uses the stored pulse modulation sequences for triggering the power amplifier module to initially convert the DC to the AC output.

According to another aspect of the invention, there is provided a device which has a DC power supply and a switch connected to said power amplifier module. The microswitch is switchable to supply DC to the power amplifier module in the event that the AC supply is terminated, allowing the device to continue to supply the AC output.

According to another aspect of the invention, there is provided a method of transferring an AC supply to an AC output. The method comprises the steps of measuring predetermined characteristics of an AC supply, converting the AC supply to DC, selecting a load and output type and retrieving a corresponding pulse modulation sequence of the selected load, applying the pulse modulation sequence to the DC generating an AC output, measuring the predetermined characteristics of the AC output and responsively modifying the pulse modulation sequence and applying the modified pulse modulation sequence to the DC, and repeating the steps of modifying and applying until the AC output is substantially in phase with the AC supply.

DESCRIPTION OF THE DRAWINGS

In drawings which illustrate embodiments of the invention.

DETAILED DESCRIPTION OF THE INVENTION

Figure 1A:
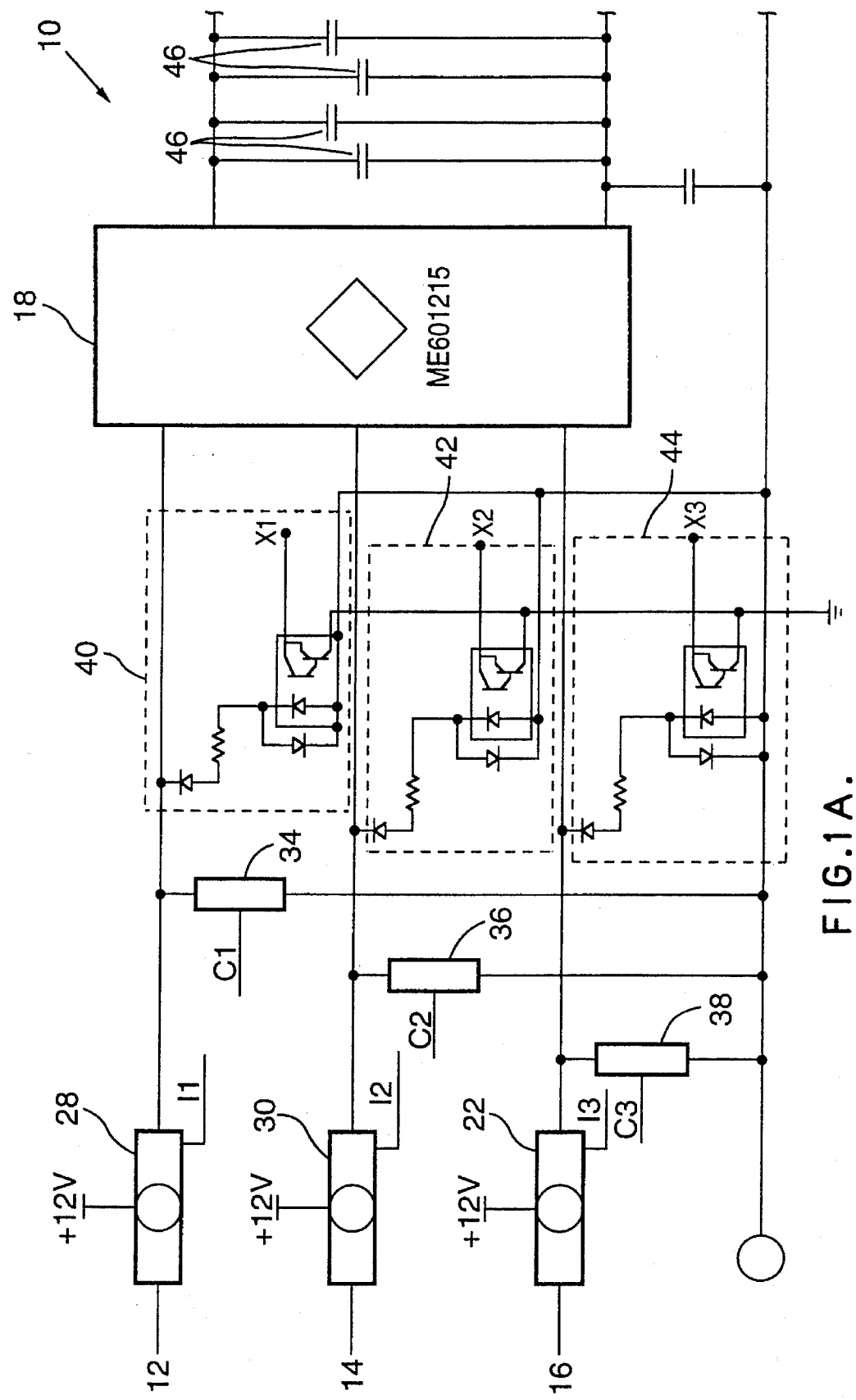
FIG. 1 is a schematic diagram of power amplifier module of the present invention.
Figure 1B:
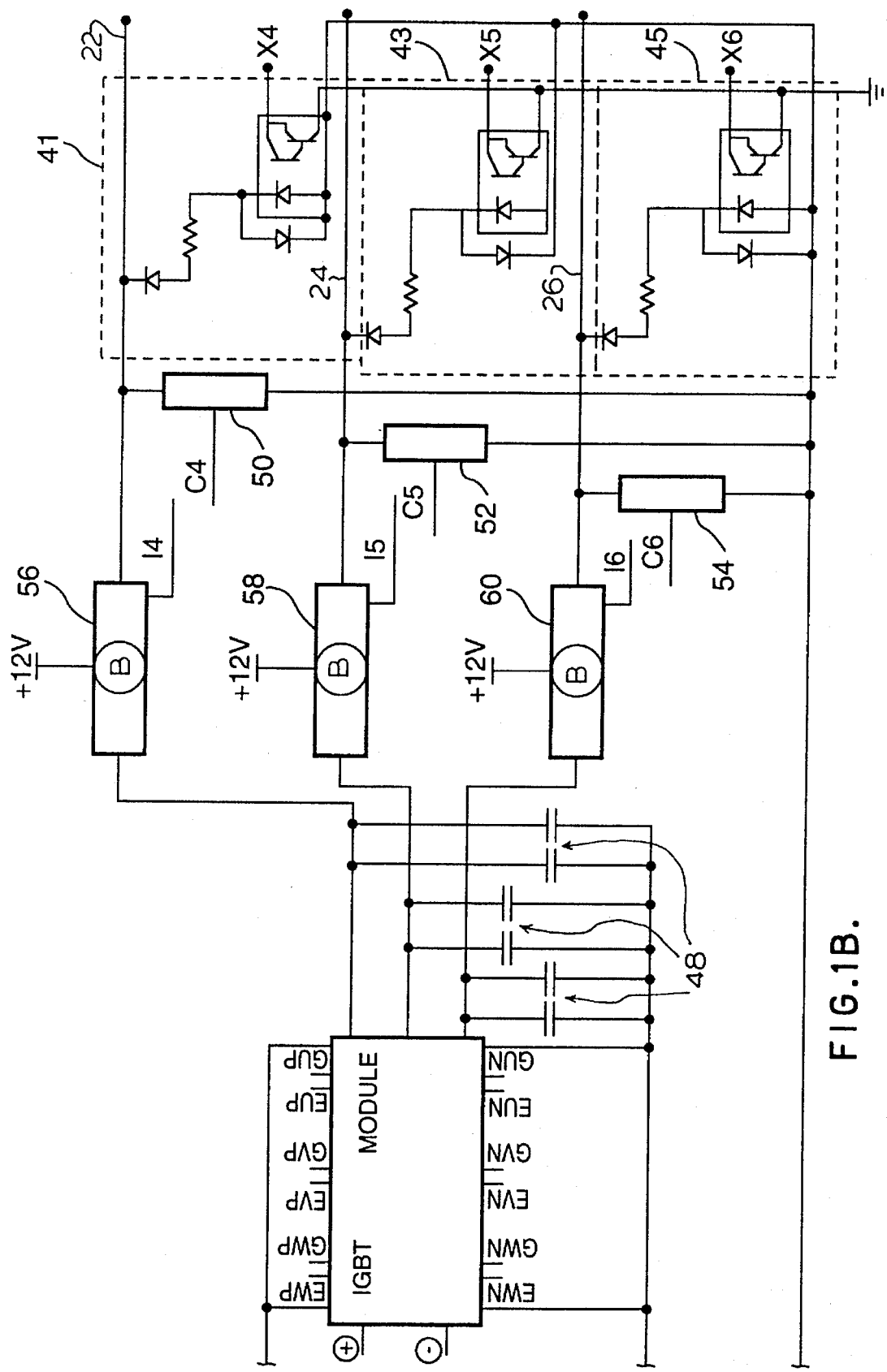
Figure 4:
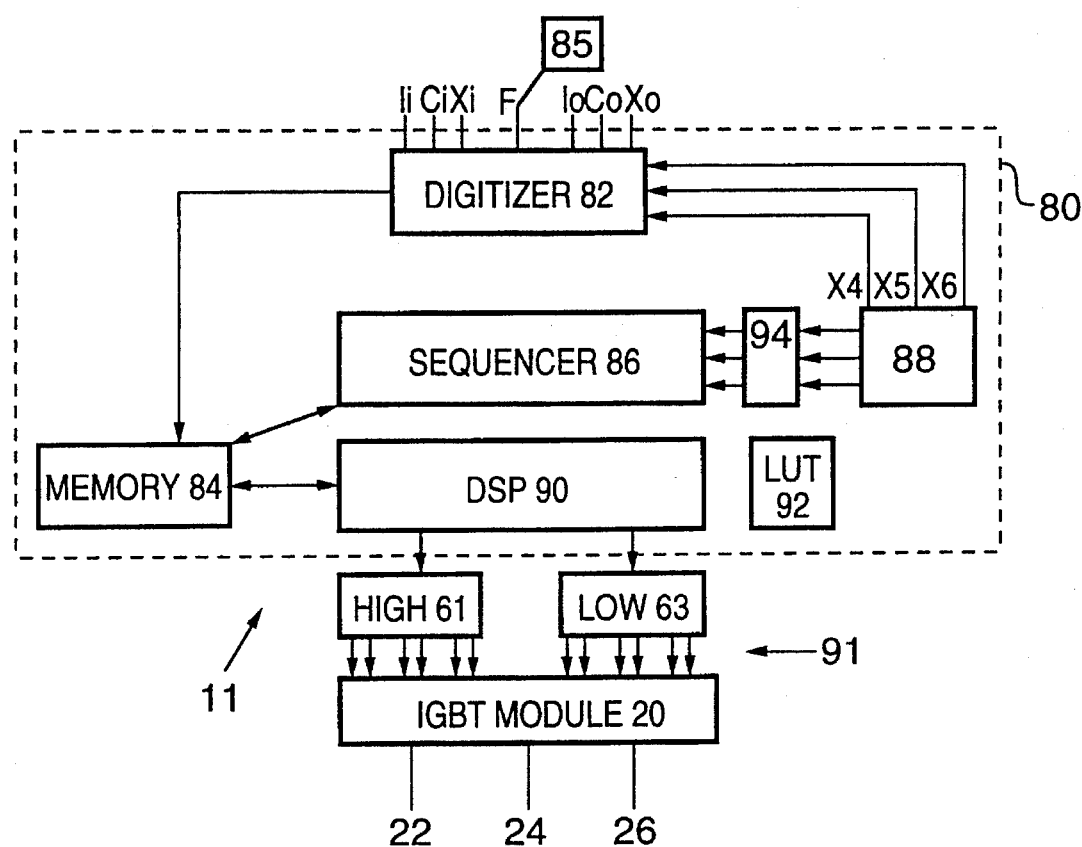
FIG. 4 is a schematic diagram of the control module of the present invention.

The energy control unit of the present invention generally comprises a power amplifier module 10, which is schematically illustrated in FIG. 1 and a control module 11, which is schematically illustrated in FIG. 4.

The power amplifier module 10 comprises inputs 12,14, 16 which are connectable to an AC power main, a bridge rectifier 18, an IGBT module 20 and outputs 22,24,26.

Connected between the inputs 12,14,16 and the bridge rectifier 18 are current sensors 28,30,32, input voltage sensors 34,36,38 and frequency sensors 40,42,44.

Connected between the DC output of the bridge rectifier 18 and the input side of IGBT module 20 are a number of capacitors 46. The output side of the IGBT module 20 has a plurality of ganged capacitors 48, output voltage sensors 50,52,54, output current sensors 56,58,60 and output frequency sensors 41,43,45.

Each of the current sensors 28,30,32 and 56,58,60 has conductors wound around ferrite torroidal air cores that have a gap into which is fitted a hall effect sensor supplied by 12 volts DC. Changes in source current are measured by the hall sensor and a corresponding voltage signal I1,I2,I3 is supplied to the source current input terminals of the control module 11. Changes in output or load current are measured by the hall sensor and a corresponding voltage signal I4,I5,I6 is supplied to the load current input terminals of the control module 11.

Each of the input voltage sensors 34,36,38 and the output voltage sensors 50,52,54 has a 100:1 ratio resistive voltage divider network. Each voltage signal C1,C2,C3 is supplied to source voltage input terminals of the control module 11. Similarly, each output voltage signal C4,C5,C6 is supplied to output voltage input terminals of the control module 11.

Each of the frequency sensors 40,42,44 and 41,43,45 has a diode for half-wave rectification and a dropping resistor in series connected to the cathode of the LED. This is a portion of a photo darlington transistor. The emitter goes to circuit ground, the base to the phase input terminals of the control module 11 for transmitting signals X1,X2,X3 and X4,X5, X6, respectively.

Bridge rectifier 18 is standard full wave three phase bridge rectifier module. Suitable modules are commercially available under the designation ME601215. The bridge rectifier 18 is selected according to the energy transfer requirements of the desired load.

The capacitors 46 are a bank of capacitors, comprising a large capacitor for filtering AC ripple and a small capacitor for filtering transients. Each output terminal of the IGBT module 20 has a bank of ganged filter capacitors 48 connected between output terminal and negative for suppression of load induced transients. A resistor capacitor diode (RCD) type snubber circuit could also be connected across the input and output terminals of each IGBT module 20 for additional protection from transients.

Optionally, a bus bar circuit could also be used to minimize transients. The bus bar circuit generally has similar characteristics as a RCD type snubber circuit.

The IGBT module 20 has two sets of inputs, the positive wave inputs and the negative wave inputs. The positive wave inputs cause the IGBT module 20 to switch producing a pulse modulation sequence for producing a positive half of a sinusoidal waveform. For the high side, the IGBT module 20 has input pairs EWP,GWP, EVP,GVP and EUP,GUP.

The negative inputs cause the IGBT module 20 to switch producing a pulse modulation sequence for producing a negative half of a sinusoidal waveform. For the low side, the IGBT module 20 has input pairs EWN,GWN, EVN,GVN and EUN,GUN.

Figure 2:
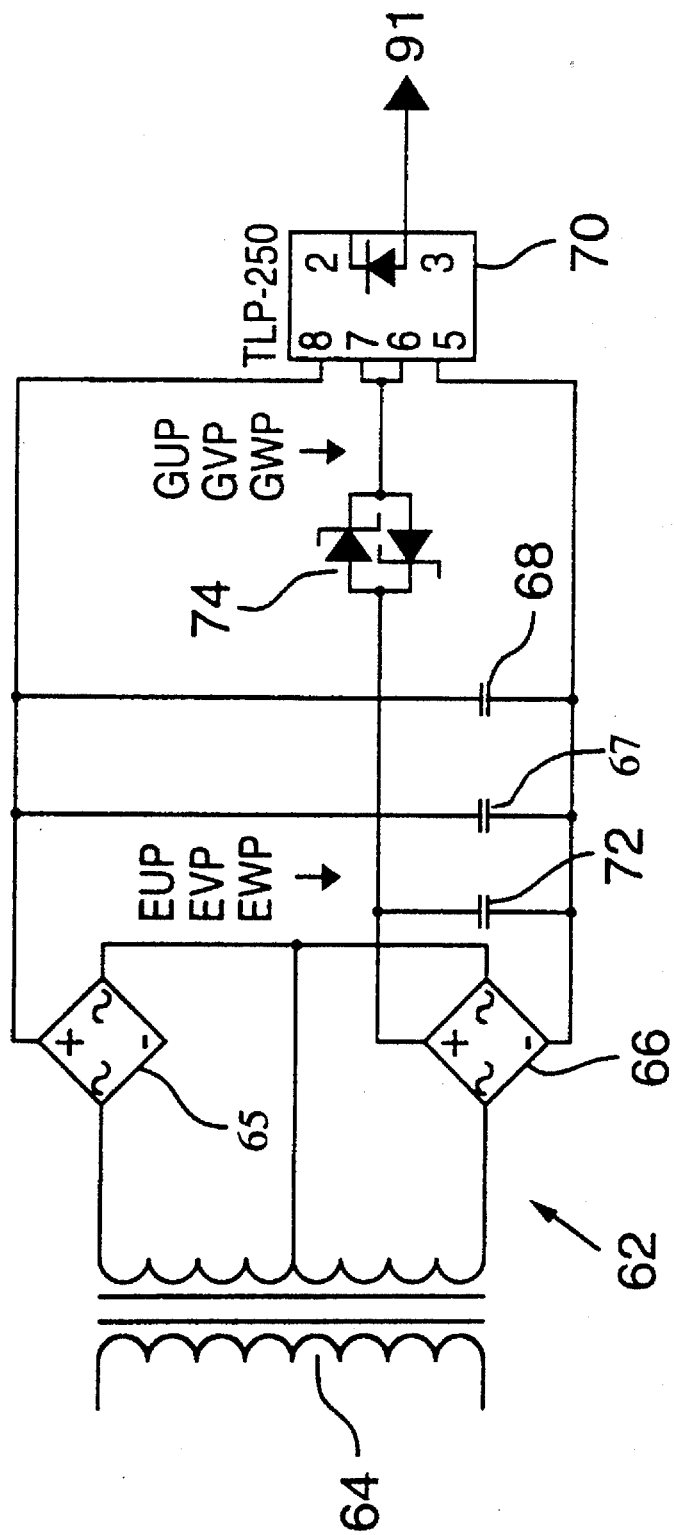
FIG. 2 is a schematic diagram of the trigger circuit for triggering each of the high side IGBTs of the present invention.

Referring now to FIG. 2, the high side IGBT trigger circuit 61 is schematically illustrated. For the high side, the IGBT trigger circuits are separate circuits for each phase. In other words three separate circuits are required to generate the positive portions of the three phase AC output.

The high side IGBT trigger circuit comprises a DC power source 62, in this case, a transformer 64 connected to a pair of full wave bridge rectifiers 65, 66 for generating DC power.

Connected in parallel across the DC source 62 are two capacitors 67, 68 and integrated circuit (IC) 70 (pins 5 and 8). IC 70 is a commercially available chip from Toshiba and designated as TLP-250. The TLP-250 is a IGBT gate drive and consists of a GaAlAs light emitting diode and an integrated photodetector and is well suited as a gate driving circuit of an IGBT. The TLP-250 has an 8-lead DIP package.

Capacitor 72 is connected in parallel across rectifier 66. DIAC 74 is connected to the positive side of the rectifier 66 and connected to pins 6 and 7 of the IC 70. On the negative side of DIAC 74, each of EWP, EVP and EUP is connected to IGBT module 20. On the positive side of DIAC 74, at pins 6 and 7 of IC 70, each of GWP, GVP and GUP is connected to IGBT module 20.

Figure 3:
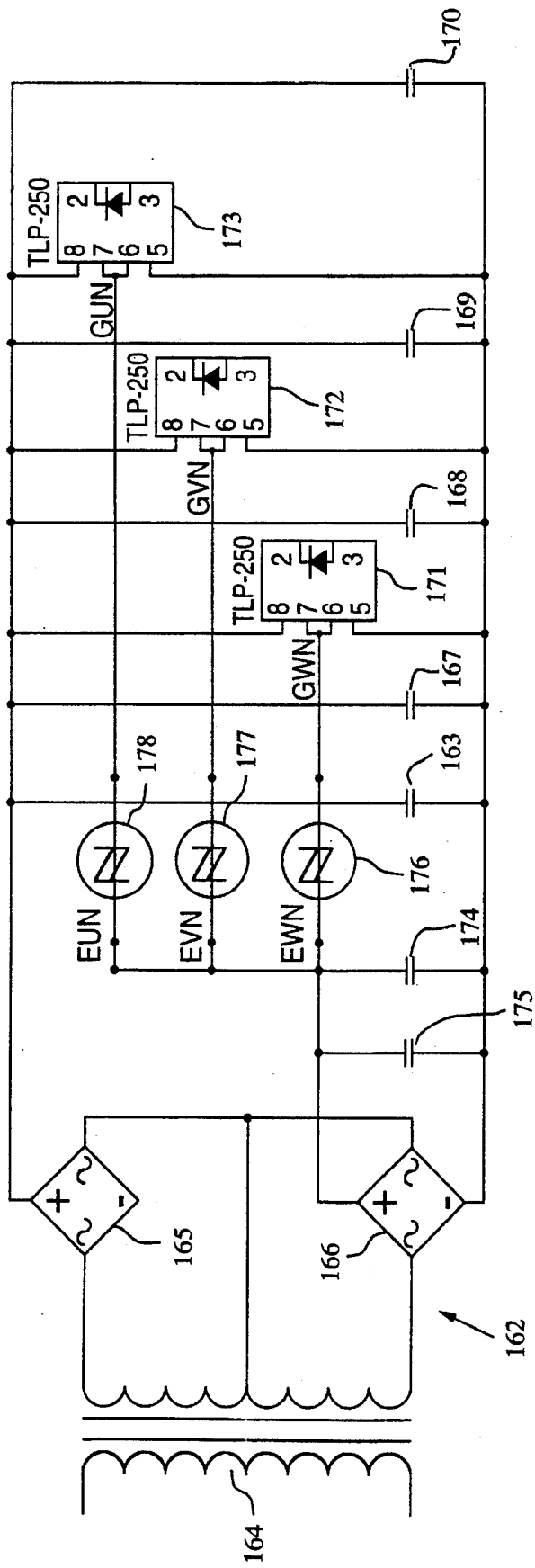
FIG. 3 is a schematic diagram of the trigger circuit for triggering all of all of the low side IGBTs of the present invention.

Referring to FIG. 3, a low side IGBT trigger circuit 63 is illustrated. The low IGBT trigger circuit 63 is similar to the high side trigger circuit 61, except that the low IGBT circuit may be ganged as a tangle circuit. The low side IGBT trigger circuit 63 comprises a DC power source 162, including a transformer 164 connected to a pair of full wave bridge rectifiers 165, 166 for generating DC power.

Connected in parallel across DC source 162 are capacitors 166, 167, 168, 169 and 170 and integrated circuits 171, 172 and 173, which is also a TLP-250 chip. Capacitors 174 and 175 are connected in parallel across rectifier 166. DIACS 176, 177 and 178 are connected to the positive side of rectifier 166 and connected to pins 6 and 7 of each of ICs 171, 172, 173, respectively. The low side IGBT trigger circuit 63 can include taps for each of the three phases. On the negative side of DIACS 176, 177, 178, each of EWN, EVN and EUN is connected to IGBT module 20. On the positive side of DIAC 75, at pins 6 and 7 of IC 171, 172, 173, each of GWN, GVN and GUN is connected to IGBT module 20.

Pin 3 of each of the ICs 171, 172, 173, on both the high and low side, is connected to the control module 11. The IC 171, 172, 173 are connected to the control module 11 via an optocoupler 91 device for electrical isolation. Optocouplers are well known in the art. The optocoupler used in the preferred embodiment is a standard resistor-diode LED-optocoupler LED circuit.

In the preferred embodiment, the DIACs 74, 176, 177, 178 are as physically close to the gates of the IGBT module 20 as is feasible. The physical closeness mitigates damage to the firing circuits from transients.

It is readily understood that the source of DC power for the trigger circuits could include other convention DC power sources, such as a voltage regulator.

Referring to FIG. 4, the control module 11 is schematically illustrated. The control module has a controller 80 which preferably is an Application Specific Integrated Circuit (ASIC). The controller 80 includes a digitizer 82, a plurality of electronic memory banks 84, a sequencer 86, three oscillators 88 and a digital signal processor (DSP) 90, a look-up table 92 and a phase lock loop circuit 94.

The signals for the source current I1,I2,I3, voltage C1,C2, C3 and frequency X1,X2,X3 and output current I4,I5,I6, voltage C4,C5,C6 and frequency X4,X5,X6 are directed to and digitized by digitizer 82 and stored in the electronic memory 84.

Memory 84 is a plurality of memory banks which are relatively small and are commercially available components. For three phase, memory 84 comprises at least six banks of memory. The banks are grouped into two major sections: for each phase the active section and the standby section.

The sequencer 86 is connected to the memory to monitor each of the incoming phases. Based on a flag set by the DSP at the appropriate phase intervals, the sequencer 86 will switch from the currently being used memory to the other of the active or standby memory at the zero crossing points. This can occur about 120 times per second, thereby permitting correction for phase non-linearities in either the high or the low portion of the AC waveform, assuming the zero crossing point as being the defining zero point. It is readily understood that higher frequencies could also be used, for instance nominal 440Hz avionics frequency.

The high precision oscillators 88 measure very accurately the incoming phase and pulse widths of each of the incoming AC power main. There are a minimum of three oscillators for a three phase unit. This measurement is used to set a phase lock loop circuit 94 that is unique for each phase output circuit.

Different techniques such as Kalmun filtering etc. will be performed by the DSP 90 in non-real time to set the standby and active memories. Based on the phase variances and load transitions, the DSP 90 sets certain flags which will cause certain memory banks to change.

Each electronic memory bank is controlled independently and in many situations not necessarily a whole group will transfer from active to standby. It may only be one or two out of the six that will actually swap positions, because that one particular bank started sensing a heavier load or heavier current and needed to make certain corrections therein.

The energy control unit of the present invention comprises two major assemblies. The control module 11 (FIG. 4) which basically does not vary with the load and the power amplifier module 10 (FIG. 1) which will be scaled according to the type of load the system is controlling. Using this two stage approach, the microprocessor and all of its related displays can be maintained to the required UL/CSA ISO 9000 type electrical safety conditions required, independent of the power voltage, current or source in the system. This is due to the fact that there is a 7½ thousand volt isolation bridge in the typical power amplifier module.

The controller 80 basically controls the pulse modulation sequence that goes to the power amplifier module 10. The DSP 90 calculates the pulse modulation sequence based on data received by the various sensors. The pulse modulation sequences are transferred to IC 70 via optocouplers 91 which then drive the IGBT module 20 which have the appropriate snubber circuits connected thereto and are sized according to the type of load.

Figure 5A:
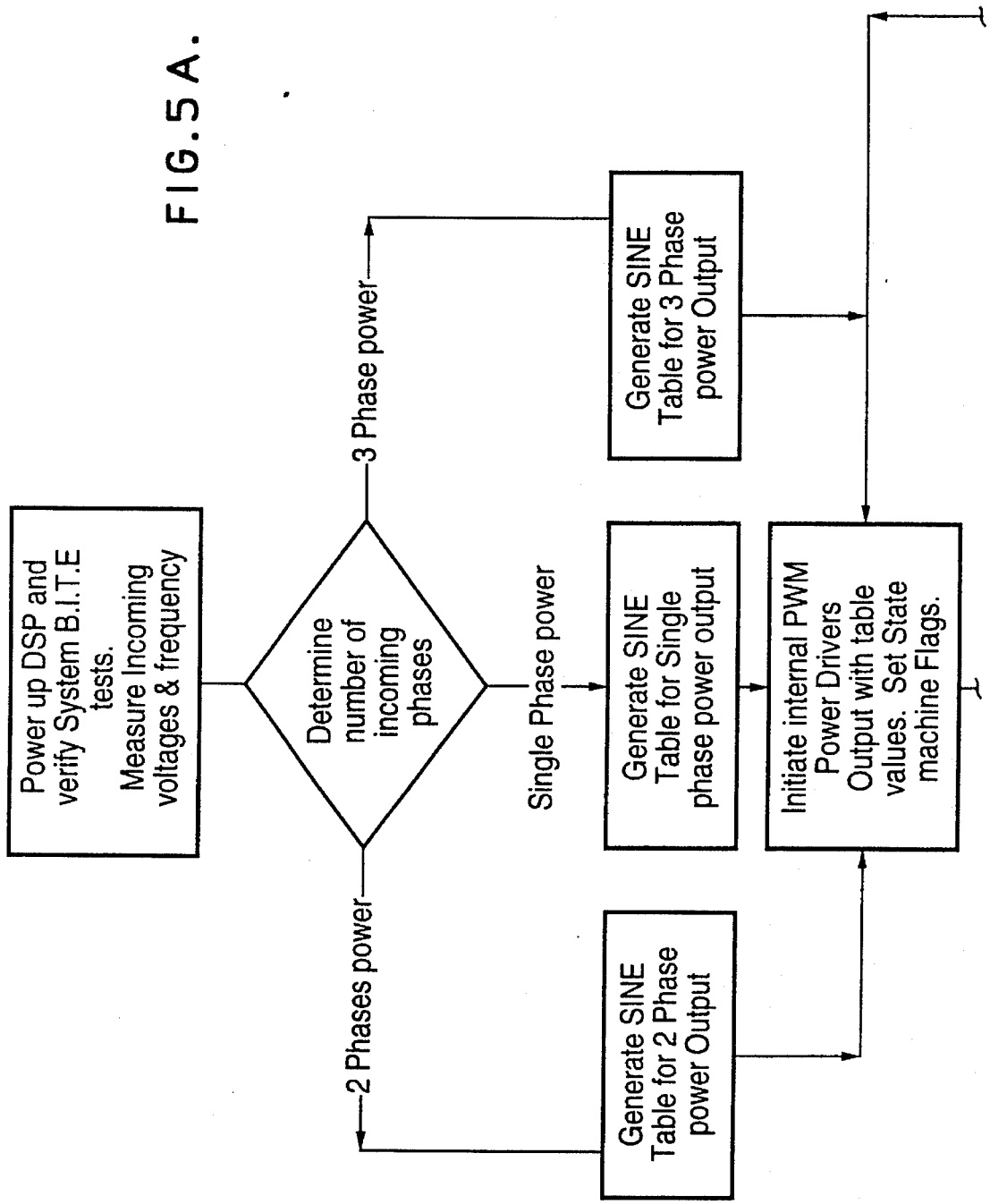
FIG. 5 is a flow diagram of the logic control of the present invention.
Figure 5B:
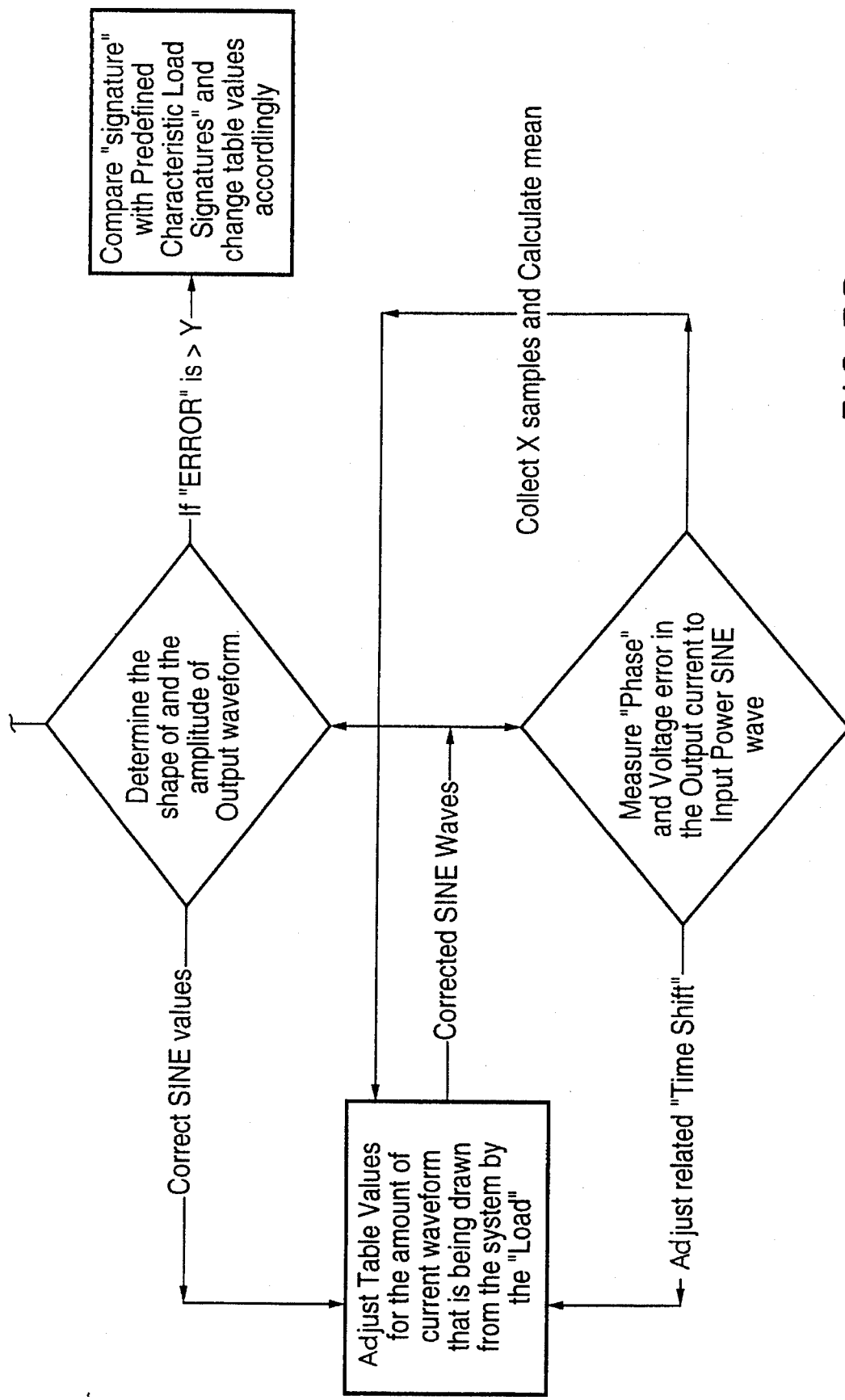

Referring to FIGS. 4 and 5, the operation of the energy correction unit of the present invention will be described in greater detail.

On powering up of the DSP 90, the internal BITE, built in test equipment, will test and verify the energy correction unit of the present invention.

The energy correction unit of the present invention receives an AC supply at its inputs 12,14,16. Each of the current sensors 28,30,32, input voltage sensors 34,36,38 and frequency sensors 40,42,44 transmits its respective signal to the controller 80. The signals are digitized by digitizer 82 and then stored in memory 84.

The sequencer 86 monitors the various incoming phases determines what type of voltage, number of phases and, what frequency that the incoming power supply is providing to the unit. The sequencer 86 determines the number of phases of the AC supply and then selects the output mode, i.e. single phase, two phase, three phase, etc.

Once the output has been selected, the DSP 90 then looks into a look-up table 92 and determines how it is to operate, whether it is to supply three phase out for the three phase in or three phase out for a single phase in, and what voltage it is to generate. The DSP 90 will retrieve a pulse modulation sequence of a sine table for the corresponding phase output. The pulse modulation sequence is a sequence of pulses which are transmitted to the trigger circuits 61 and 63 which trigger the IGBT module 20 to produce the desired AC output waveforms. Pulse width modulation techniques are well known in the art.

The DSP 90 transmits the selection of output to the oscillators 88 which in turn selects the frequency of the output and transmits the output frequency signals X4,X5,X6 to the digitizer 82 and to the phase lock loop circuit 94. The output frequency signals X4,X5,X6 are each single signals which are generated when a change in voltage polarity of the sine wave is detected.

The control module 11 measures a given frequency of a given sine wave and multiplies the frequency by an integer value of how many divisions or slices that will be used to generate the output sine wave. Each time slice or pulse can have from zero to 127 units, 127 units being full on, zero being full off. This permits the energy correction unit of the present invention to vary the output of the voltage output waveform.

Using the sine table values or pulse modulation sequence, based on the number of time slices, the DSP 90 will initiate the trigger circuits (FIGS. 2 and 3) for initiating pulse width modulation. The IGBT module 20 will be triggered to generate the corresponding sinusoidal output.

The energy correction unit of the present invention has supply voltage sensors 28,30,32 that permit it to sense the incoming voltage and similar output voltage sensors 56,58, 60 to sense the outgoing voltage and output current sensors 50,52,54 to sense the outgoing current being drawn by the load. The controller 80 continuously compares the shape and amplitude of each of the output waveforms with the shape and amplitude of each of the corresponding input waveforms.

It is noted that output frequency signals are generated by both the oscillators 88 and the frequency sensors 41,43,45. In some applications, it is not essential to produce both frequency signals. The cost of production could be reduced by eliminating the output frequency sensors 41,43,45.

If the sine values are correct, i.e., the output current and voltage are in phase with the input current and voltage, the modulation signals are adjusted for the amount of current that is being drawn by the output load.

If the sine values are not correct, i.e., the output current and voltage are out of phase with the input current and voltage by an amount greater than a predetermined value, the shape and amplitude of the output waveform is compared against a table of known load characteristics stored in look-up table 92.

For instance, a load such as fluorescent lighting has a specific "signature", or load characteristics, which identifies the load. Using known fuzzy logic methods, the controller 80 selects the closest "signature" of known loads with the measured output waveform. Using the "signature", the new pulse modulation sequence is selected and stored in the standby section of memory 84 which is then switched to the active section at the next zero crossing.

The active section of the memory 84 is being read by the DSP 90. At the appropriate times signalled by the phase lock loop circuit 94, the DSP 90 delivers the appropriate pulse width modulation signals that are required for the power amplifier module 10. The same applies vis-a-vis the standby bank in that although the data of the sine table values is not being affected, the output pulse modulation is being updated by the DSP 90 processor based on measured parameters and calculated results of what should be done, with respect to voltage, current, total harmonic distortion, frequency, impedance and load type performance.

In particular, the controller 80 continuously compares each half of the sine wave or the three sine waves, assuming three phase power, of the output with the input sine wave or waves to determine the amount of phase shift between the input and output waveforms. If the phase difference is greater than a preselected minimum, the sine table values are shifted by a corresponding amount to maintain phase alignment. What this means is that a space time switch function is being performed. Voltage is being generated at the appropriate time by the IGBTs, so that the current will line up back with the original AC power main.

For example, a 150 hp motor requires 150 amps to drive it. If attempts were made to try to store the requisite amount of energy for the 270° required to maintain phase alignment, assuming a 90° phase shift required to bring back in alignment with a 360° of the sine wave, the amount of energy is significant. By changing the actual pulse width waveform and moving it so that the current lines up with the incoming phase of the power, the function of the energy correction unit is to load balance or shed the load across the multiphase power that is being converted to DC and by steering them appropriately such that the currents are equalized. Since there is a correlation between the current and the voltage, the power factor function is implemented without other inductors to augment the system.

The controller 80 generates the optimum waveforms required by the load and therefore the efficiency of the load can be increased while reducing the load's power consumption and yet still maintain synchronization to the incoming power as it fluctuates in frequency and in phase alignment. These will result in direct return on investment type savings for the user of the system.

The energy control unit of the present invention can also be equipped with a vibration sensor 85 and an encoder to transmit a vibration signal F. The vibration signal F is digitized by digitizer 82 and then stored in memory 84.

The electronic memory banks 84 are provided with a standard output for downloading the stored and updated waveforms. The memory 84 can supply data on demand to a network through an appropriate adaptor to a personal computer to download information concerning the last series of events that have occurred in the machine as well as download the log of stress conditions and vibration conditions.

The energy control unit of the present invention is able to learn what are the nominal waveforms and what vibration characteristics of that unit are under normal and varying conditions. The DSP 90 is able to interpolate the relationship of normal waveforms and vibration and generate a series of guard bands that will basically encompass the various modes of operation at different frequencies. The energy control unit of the present invention is able to correlate the vibration signatures of the machine with its database and detect any abnormalities and based on the level of the abnormalities either report an audio alarm or shut down the system as the case may be.

An example of the use of this feature is a bearing that may be wearing and starting to cause the system to vibrate. This feature greatly facilitates preventive maintenance and permits preventative maintenance to be done before any significant damage has been incurred by the machine.

This feature also informs the system or the user if there has been certain types of power inconsistencies from the main side that for which the energy control unit of the present invention has adapted. For example if a phase has been lost, the energy control unit of the present invention will have dropped in efficiency.

Figure 6:
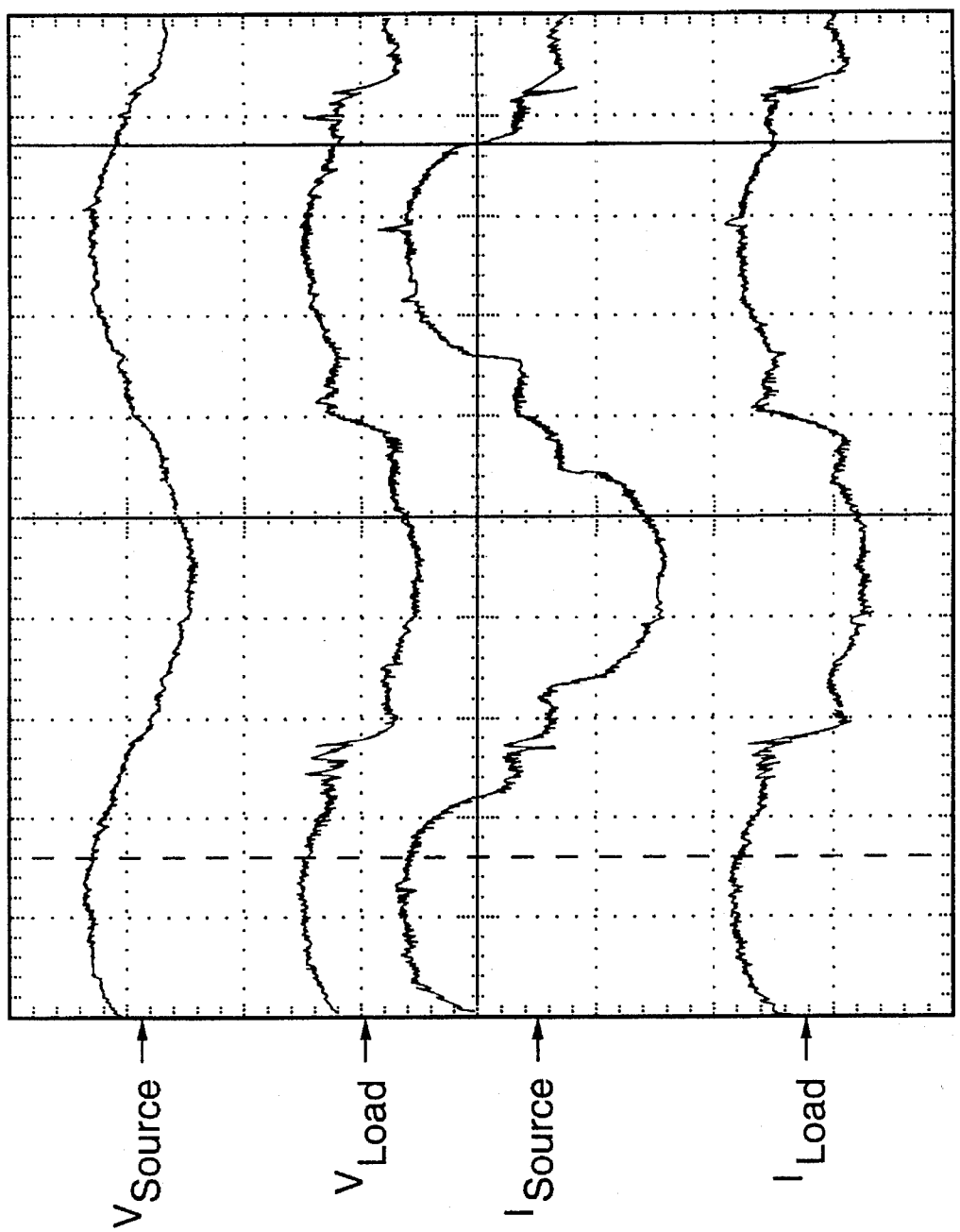
FIG. 6 is an illustration of the input and output waveforms of a demonstration unit embodying the present invention.

Referring to FIG. 6, the sample waveforms of a demonstration unit are illustrated. It can be observed that the supply voltage and current are in phase with the output voltage and current. The demonstration unit was connected to a 1500W heater as the sample load.

The demonstration unit of the present invention was found to be able to generate three phase power from a single phase source and vice versa, as well as generate any frequency and any voltage regardless of the input voltage as long as the output voltage did not exceed the input voltage. In particular, the demonstration unit was observed to be able to generate three phase power from a single phase power supply with about 85% efficiency.

The advantage of the energy correction unit of the present invention is that the unit protects any three phase motor or three phase dependent appliance from power outages or some disruption in the power mains. In any normal application if a single phase wire is dropped, the multi-phase motor will try to continue to operate with the reduced voltage. If the reduced voltage is not corrected in a very short interval, the motor will start to burn out. With the present invention, the motor will operate at a reduced capacity but would not be damaged in any way, shape or form.

An additional advantage of the energy correction unit of the present invention is that the energy correction unit of the present invention will protect the load during shut down. There are multiple ways of stopping motorized type loads. Obviously the simplistic and most gentle stop is that power to the motor is terminated and it will just slowly wind down on its inertia.

Another method is to take two of the three windings and connect them together across the power rail. Any AC motor when it is running under its inertia or momentum will operate as a generator. By shorting the two windings together to the one side of the rail, causes the voltage that the motor generates to be fed back to itself and cause a soft breaking function. By the same token if all three phases of the motor are connected to the same side of the switch, a more robust braking action is experienced as more of the motor's EMF power is fed back into itself.

The fourth method of shutting down a motor is to supply reversing power to the multiphase motor so that the motor slows down as quickly as possible. As soon as the motor is starting to change direction, the power is terminated. This would result in a very abrupt stop to give the emergency type stop function that would be required in many applications.

In each of these shut down methods, the energy control unit of the present invention will compensate to prevent damage to the motor and also prevent phase shifting between the supply and the load.

The demonstration unit was also observed to be able to load balance. For example, a heating air conditioning unit in an industrial building uses a compressor motor which is 3-phase. A fan which circulates cooling air about the coils is one phase and is connected across one set of compressor motor windings. A pump which circulates coolant is also one phase and is connected across on another phase. This arrangement results in a significant imbalance in the power. The bigger the plant, the bigger the imbalance. The energy control unit of the present invention is able to supply the required energy to each phase alleviating the load imbalance.

Besides providing the power factor correction the energy correction unit of the present invention automatically balances any load connected to it. This results obviously in less high current draws which again results in power savings, vis-a-vis hydro demand meters, as well as the fact that the energy correction unit of the present invention is able to generate true 120° three phase power regardless of phase distortions that will occur coming in from the power grid. These distortions occur depending upon the distance the hydro station is to where the actual user is in the power grid.

The energy correction unit of the present invention also blocks any distortions that may be coming in from the AC mains to color the data being generated by the unit generating power to the load. Depending on the utility as well as the distance, a user may experience distortions as the power frequency going down and up by several hertz for which normally the utility corrects at the end of the day. For synchronous type items like clocks, these distortions affect a significant number of speed sensitive devices. The energy correction unit of the present invention regulates the frequency of the output supply and therefore minimizes power frequency distortions.

Not only does the energy correction unit of the present invention clean up the effects of the load on the mains, it will also clean the effects of the mains to the load.

An additional feature of the present invention is that the energy control device may be used as a step down transformer. For example, if the number of outputs is less than the number of inputs the energy from the redundant supply phase may be distributed to the output(s). Conversely, if the number of outputs is greater than inputs the RMS power is distributed in a controlled manner to each output subject to the input supply capability.

Figure 7A:
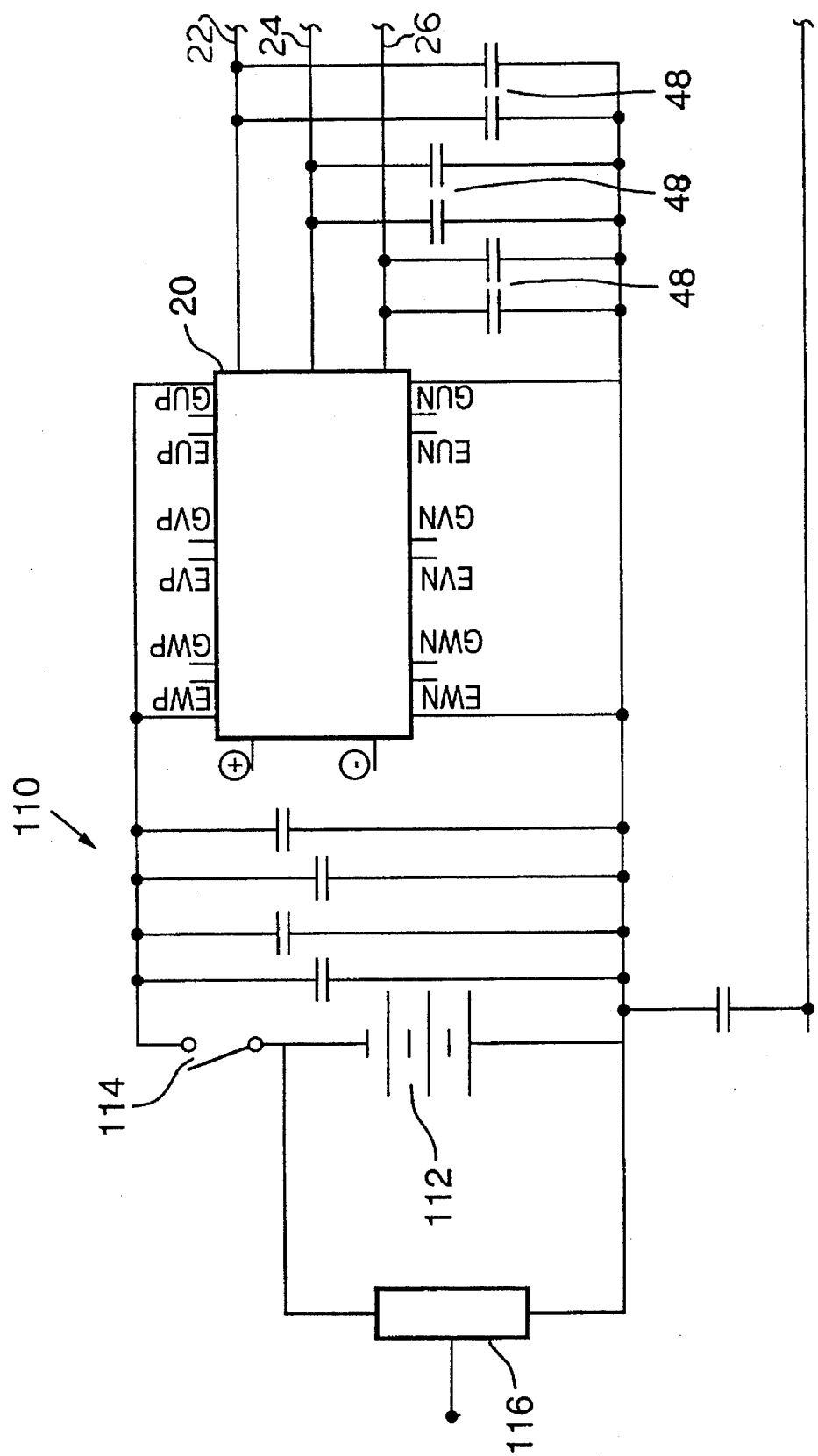
FIG. 7 is a schematic diagram of a second embodiment of a power amplifier module of the present invention.
Figure 7B:
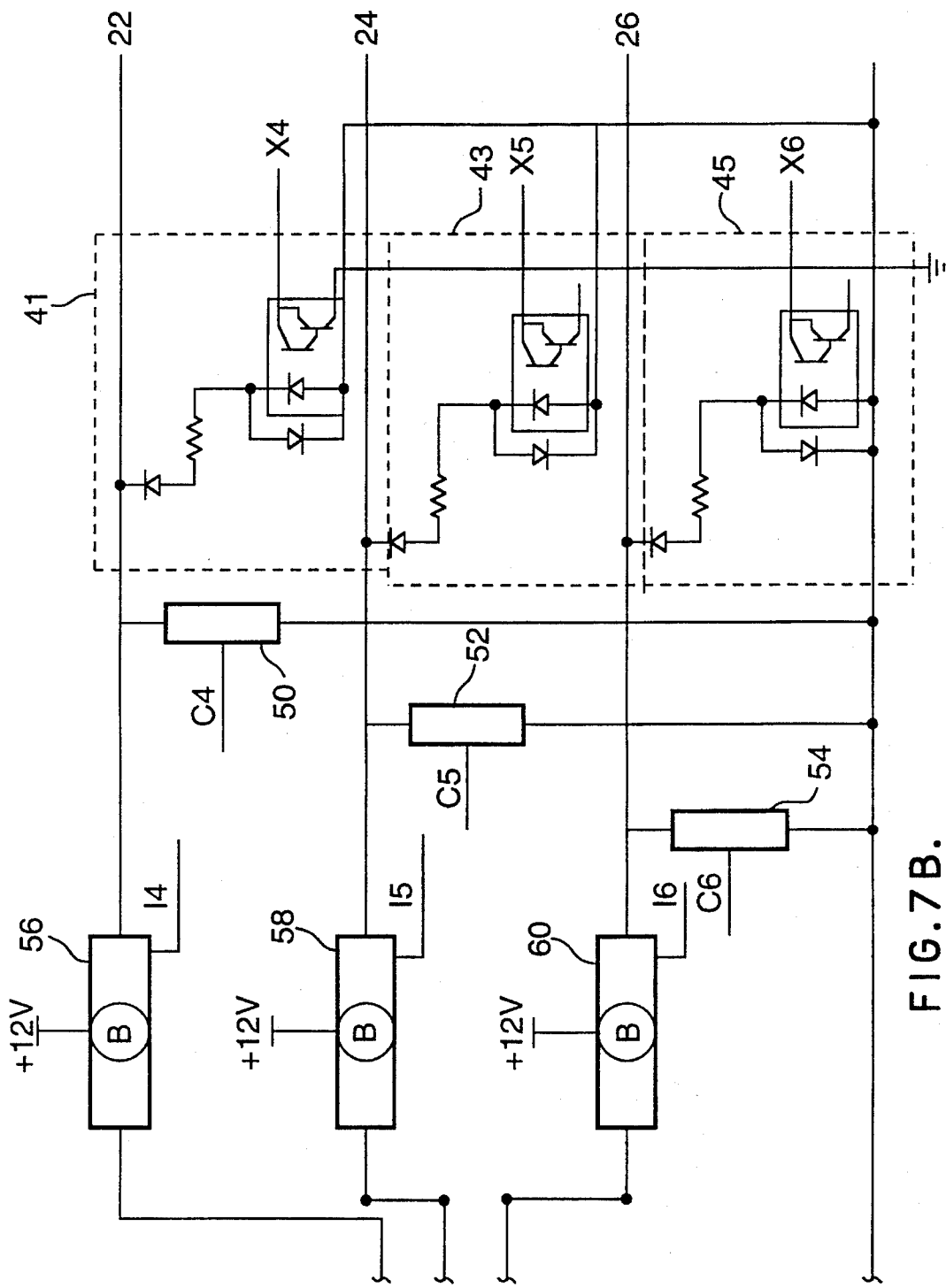

A second embodiment of a power amplifier module 110 is illustrated in FIG. 7. The AC supply is replaced by or used in conjunction with a DC source. Suitable DC source include batteries 112 or a voltage regulator.

In a stand alone condition, the power amplifier module 110 will act as a power invertor converting DC to an AC output. Since power factor correction is not a priority, the control module 11 will only modify the pulse modulation sequence for the current drawn by the load and will not attempt to correct for power factor.

The DC source could also be used in conjunction with the power module of FIG. 1. The energy control device of the present invention will act as an uninterrupted power supply.

A bi-directional semiconductor switch 114 is connected in series with battery 112 and voltage sensor 116. In the event that power is lost, the bidirectional semiconductor switch 114 within milliseconds will operate so that power now flows out of the batteries into the power bus and the unit will continue to supply power until power is maintained provided adequate battery capacity is available.

In the event that insufficient battery capacity is available, an appropriate warning signal from voltage sensor 116 will be issued before the batteries will degrade in voltage to the point that the system cannot operate and will signal a warning signal to the operator so that dependent equipment can do an orderly shutdown before the power is lost.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. A device for controlling energy being delivered to an AC output from an AC supply, comprising:

a plurality of input sensors connectable to the AC supply for monitoring frequency and voltage of the AC supply and generating input signals proportional thereto;

a power amplifier module connectable to the AC supply, said power amplifier module having means for converting an AC supply to DC and having a pulse width modulator for convening the DC to an AC output, a plurality of output sensors connected the AC output for monitoring frequency and current of the AC output and generating output signals proportional thereto, said AC output connectable to an AC load; and a control module in communication with the plurality of input sensors and the plurality of output sensors for receiving said input signals and said output signals and with the power amplifier module, said control module having a look up table having stored therein a plurality of pulse width modulation sequences for triggering said pulse width modulator to generate an AC waveform, said control module having an electronic memory comprising an active section and a standby section, the control module selects from said look up table a pulse width modulation sequence for initially triggering said pulse width modulator to convert the DC to the AC output and stores said pulse width modulation sequence in said active section of the memory to trigger said pulse width modulator, said control module continuously receives and compares the input signals and the output signals to responsively select another pulse width modulation sequence from the look-up table and store said another pulse width sequence in said standby section, said control module switches between the standby section and the active section at a next zero crossing of the AC supply to maintain a current being drawn by the AC load substantially in phase relative to the voltage of the AC supply.

2. A device as claimed in claim 1 wherein said power amplifier module comprises:

a bridge rectifier for receiving the AC supply and rectifying the AC supply to DC, and said pulse width modulator is connected to the bridge rectifier.

3. A device as claimed in claim 2 wherein said control module comprises a controller for controlling and triggering the pulse width modulator, said controller communicating with said active section for receiving a pulse width modulation sequence.

4. A device as claimed in claim 3 wherein said controller comprises a digitizer, said electronic memory, a sequencer and a digital signal processor, said digitizer receives said signals from said sensors and digitizes each signal, said sequencer monitors said digitized signals and determines an output mode and frequency and said digital signal processor retrieves from said look up table said initial pulse width modulation sequence to initiate pulse signals for said pulse width modulator and said digital signal processor analyzes the input signals of the AC supply and the output signals of the AC output to determine a shape and amplitude of the AC supply and the AC output and responsively selects the another pulse width modulation sequence by determining whether the AC output is substantially in phase with the AC supply, and if substantially in phase, selects a pulse width modulation sequence responsive to an amount of current being drawn by the AC load, and if out of phase, compares the shape and amplitude of the AC output with stored shapes and amplitudes of known loads and selects a closest one of said stored shapes and amplitudes and selects from the look up able a pulse modulation sequence corresponding to said closest one and applying the corresponding pulse modulation sequence to the DC.

5. A device as claimed in claim 1 wherein said control module is in communication with said power amplifier module via optocouplers to maintain electrical isolation.

6. A device as claimed in claim 1 wherein said device further includes a DC power supply and a switch connected to said power amplifier module, said switch being switchable to supply DC to the power amplifier module in the event that the AC supply is terminated.

7. A method of transferring an AC supply to an AC output with an AC load, the method comprising the steps of monitoring frequency and voltage of the AC supply and generating input signals proportional thereto, converting the AC supply to DC, selecting from a look up table a pulse modulation sequence, storing the selected pulse modulation sequence in an active section of a memory and applying the selected pulse modulation sequence to the DC to initially generate an AC output, monitoring frequency and current of the AC output and generating output signals proportional thereto, analyzing the input signals of the AC supply and the output signals of the AC output, to determine a shape and amplitude of the AC supply and the AC output and responsively modifying the pulse width modulation sequence by determining whether the AC output is substantially in phase with the AC supply, and if substantially in phase, adjusting the voltage output waveform responsive to an amount of current being drawn by the AC load, and if out of phase, comparing the shape and amplitude of the AC output with stored shapes and amplitudes of known loads and selecting a closest one of said stored shapes and amplitudes and selecting from the look up table a pulse width modulation sequence corresponding to said closest one, storing the corresponding pulse width modulation sequence in a standby section of a memory and switching between the active section and the standby section at a next zero crossing of the AC supply to apply the corresponding pulse width modulation sequence to the DC, and repeating the steps of analyzing and modifying until the current of the AC output is substantially in phase with the voltage of the AC supply.

8. A method as claimed in claim 7 wherein said pulse modulation sequences are tables of sine wave values.

9. A method as claimed in claim 8 wherein said method includes the step of accumulating shapes and amplitudes and corresponding pulse sequences from observations of loads being driven by an AC supply and storing the shapes and amplitudes and corresponding pulse modulation sequences in the look up table.

10. A device as claimed in claim 1 wherein said power amplifier module has three inputs, each for receiving a phase of a three phase AC supply and said control module has three outputs, each for delivering a phase of a three phase AC output.

11. A device as claimed in claim 10 wherein said pulse width modulator has three high side triggers and three low side triggers, each for triggering a high and a low half waveform for each of said phases of said three phase AC output.

12. A device as claimed in claim 1 wherein said device further includes a vibration sensor mountable on said AC lead and connected to said control module, said vibration sensor having means for generating a vibration signal for analysis by said control module.

13. A method as claimed in claim 7, wherein said method includes a step of periodically saving the corresponding pulse modulation sequence in said look up table.

14. A method as claimed in claim 13, wherein said selected pulse modulation sequence is a last to be saved corresponding pulse modulation sequence.

15. A method as claimed in claim 14, wherein said method further includes a step of monitoring vibration of said AC lead and generating vibration signals proportional thereto, storing said vibration signals in an electronic memory and interpolating said saved corresponding pulse modulation sequences with said stored vibration signals to detect abnormalities of said AC lead.

* * * * *